United States Patent [19]
Colaianni

[11] Patent Number: 5,848,576
[45] Date of Patent: Dec. 15, 1998

[54] CHILD SAFETY TETHER

[76] Inventor: Mary Colaianni, 372 Nelson Rd., Monroe, N.Y. 10950

[21] Appl. No.: 3,782

[22] Filed: Jan. 7, 1998

[51] Int. Cl.[6] .................................................. A62B 35/00
[52] U.S. Cl. ........................................ 119/770; 119/792
[58] Field of Search .................................. 119/770, 792, 119/857, 859, 907; 340/573, 432, 542, 568

[56] References Cited

U.S. PATENT DOCUMENTS

| | | | |
|---|---|---|---|
| 895,506 | 8/1908 | Sence | 340/573 X |
| 4,667,624 | 5/1987 | Smith | 119/770 |
| 4,745,883 | 5/1988 | Bagetta | 119/770 |
| 4,765,279 | 8/1988 | Klickstein | 119/770 |
| 4,788,532 | 11/1988 | Maldonado | 340/574 |
| 4,788,941 | 12/1988 | Villeneuve | 119/857 |
| 4,888,580 | 12/1989 | Distel | 340/573 |
| 4,899,135 | 2/1990 | Ghahariiran | 340/573 |
| 5,259,338 | 11/1993 | Cornell | 119/770 |
| 5,307,763 | 5/1994 | Arthur et al. | 119/718 |
| 5,408,220 | 4/1995 | Brown et al. | 340/571 |
| 5,457,440 | 10/1995 | Daddono | 340/573 |
| 5,492,110 | 2/1996 | Lenz et al. | 128/202.22 |
| 5,510,771 | 4/1996 | Marshall | 340/573 |
| 5,540,188 | 7/1996 | Heinrichs | 119/770 |
| 5,541,579 | 7/1996 | Kiernan | 340/573 |
| 5,627,512 | 5/1997 | Bogar | 340/457.1 |
| 5,638,772 | 6/1997 | Kaufmann et al. | 119/770 |

*Primary Examiner*—Robert P. Swiatek
*Assistant Examiner*—James S. Bergin
*Attorney, Agent, or Firm*—Terrance L. Siemens

[57] ABSTRACT

A webbing type tether is disclosed having two terminal harness loops that are dimensioned to be fastened around the waists of both the care giver and the child. Embedded in the webbing is a length of wire that ends in cooperating pairs of conductive panels at the open ends of the harness loops. These panels complete a circuit when the harness loops are fastened in place, and the whole is powered to sound an audio alarm when the circuit is broken. Additionally, intermediate the two harness loops, preferably closer to the child's harness, is a third loop that will allow the care giver to pull the child towards them quickly in case of an emergency or sudden hazard. The invention is also provided with a test switch to simulate the breaking of the circuit and a power indication LED.

12 Claims, 2 Drawing Sheets

CHILD SAFETY TETHER

BACKGROUND OF THE INVENTION

1. Field of the Invention

The present invention relates to restraining devices. More specifically, it relates to a restraining strap comprising a harness extending from a caretaker to a child. Embedded in the strap webbing are wires that form a closed circuit. If the circuit is interrupted or broken, an audio and visual alarm is activated, thus foiling an abduction attempt or alerting the adult that the child has detached themselves from the apparatus. More generally, the present invention relates to any use where the user would wish to be notified that a restraining connection has been interrupted or broken. Examples of these uses would be in a day care setting, valuable pets in a dog show type environment, or in penology where either a convicted person was being detained in a certain area, or being transferred by a law enforcement officer.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

In public areas, the worries of care givers and parents with small children are manifold: the child can wander distractedly off or, even worse, be abducted or tempted away from the responsible adult. The present invention addresses this problem by providing a physical restraining means along with an audio alarm to alert the care giver or parent that a connection has been broken.

Following hereinafter is a discussion of prior art patents that are related to the present invention:

First in the discussion is U.S. Pat. No. 4,888,580 issued on Dec. 19, 1989 to Kenneth Distel. This discloses a child protector wherein a magnetic switch is activated when a pair of opposing magnets is separated. This is unlike the present invention in that no conductive surface overlap is disclosed, nor is the central emergency strap loop of the present invention shown.

Next is U.S. Pat. No. 4,745,883 issued on May 24, 1988 to Colleen S. Bagetta. This discloses a safety tether device wherein first and second loop portions form wrist bands and an elastic central portion. Unlike the present invention there is no teaching of the centrally located emergency loop.

Another patent of interest is U.S. Pat. No. 5,510,771 issued on Apr. 23, 1996 to Burpee W. Marshall. This alarm system discloses electrical connectors that activate an alarm if disconnected. As in the patents mentioned above, there is no teaching of the overlapping conductive surfaces connected to the embedded wiring or of the intermediately located loop.

In U.S. Pat. No. 4,765,279 issued to Rueben B. Klickstein on Aug. 23, 1988, a child to adult tether is disclosed. This is clearly unlike the present invention in that there is no wiring embedded in the tether.

U.S. Pat. No. 5,638,772 issued on Jun. 17, 1997 to Mark Kaufmann et al. discloses a combination toy and child safety line. This is dissimilar from the present invention in that no electronic circuit is disclosed.

In U.S. Pat. No. 4,788,941 issued to Gerald P. Villeneuve on Dec. 6, 1988 there is disclosed a safety belt. As in other patents mentioned above, there is no teaching of an alarm or circuit.

Next is U.S. Pat. No. 5,259,338 issued on Nov. 9, 1993 to Karen L. Cornell. This discloses a safety harness for children where, like the Villeneuve patent and others, no teaching is made of any type of alarm.

U.S. Pat. No. 4,899,135 issued to Mehdi Ghahariiran on Feb. 6, 1990 discloses a child monitoring device. This is a range sensitive system that alerts a caretaker when the child or target moves beyond a predetermined distance. Unlike the present invention, there is no tether connection between the care giver and the child, nor are the overlapping conductive surfaces of the present invention taught.

In another patent of interest, U.S. Pat. No. 5,307,763 issued to David L. Arthur et al. on May 3, 1994 there is disclosed a restricted area alarm system. This uses a loop antenna for placement about a border or periphery of an area from which a target person or pet is desired to be excluded. Clearly, this is dissimilar from the instant invention where a physical connection is maintained through a tether.

Lastly, U.S. Pat. No. 4,667,624 issued on May 26, 1987 to Dorothy Smith discloses a safety harness for children. As in a number of the patents mentioned above, there is no disclosure or teaching of embedded wiring, nor of an alarm means if the connection is broken.

As will be seen, the simplicity and effectiveness of my invention is not rivaled in the prior art.

None of the above inventions and patents, taken either singly or in combination, is seen to describe the instant invention as claimed.

SUMMARY OF THE INVENTION

Briefly, the invention comprises a webbing type tether with two terminal harness loops that are dimensioned to be fastened around the waists of both the care giver and the child. Embedded in the webbing is a length of wire that ends in cooperating pairs of conductive panels at the open ends of the harness loops. These panels complete a circuit when the harness loops are fastened in place, and the whole is powered to sound an audio alarm when the circuit is broken. Additionally, intermediate the two harness loops, preferably closer to the child's harness, is a third loop that will allow the care giver to pull the child towards them quickly in case of an emergency.

Accordingly, it is a principal object of the invention to provide a new and improved child safety tether device which overcomes the disadvantages of the prior art in a simple but effective manner.

It is a major object of this invention to provide a child safety tether which will give an audio alarm if the webbing strap is cut or broken or either of the terminal loops is unfastened.

It is another object of the invention to provide a child safety tether wherein a cooperating pair of conductive surfaces at the strap ends that make up the harnesses overlay one another to complete the circuit when the harnesses are fastened about the waists of the users.

It is another object of the invention to provide a child safety tether wherein an emergency handle or loop is provided proximate the child's terminal end to allow the care giver or adult to jerk or pull the child closer to them in case of emergency.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

Figure 1:
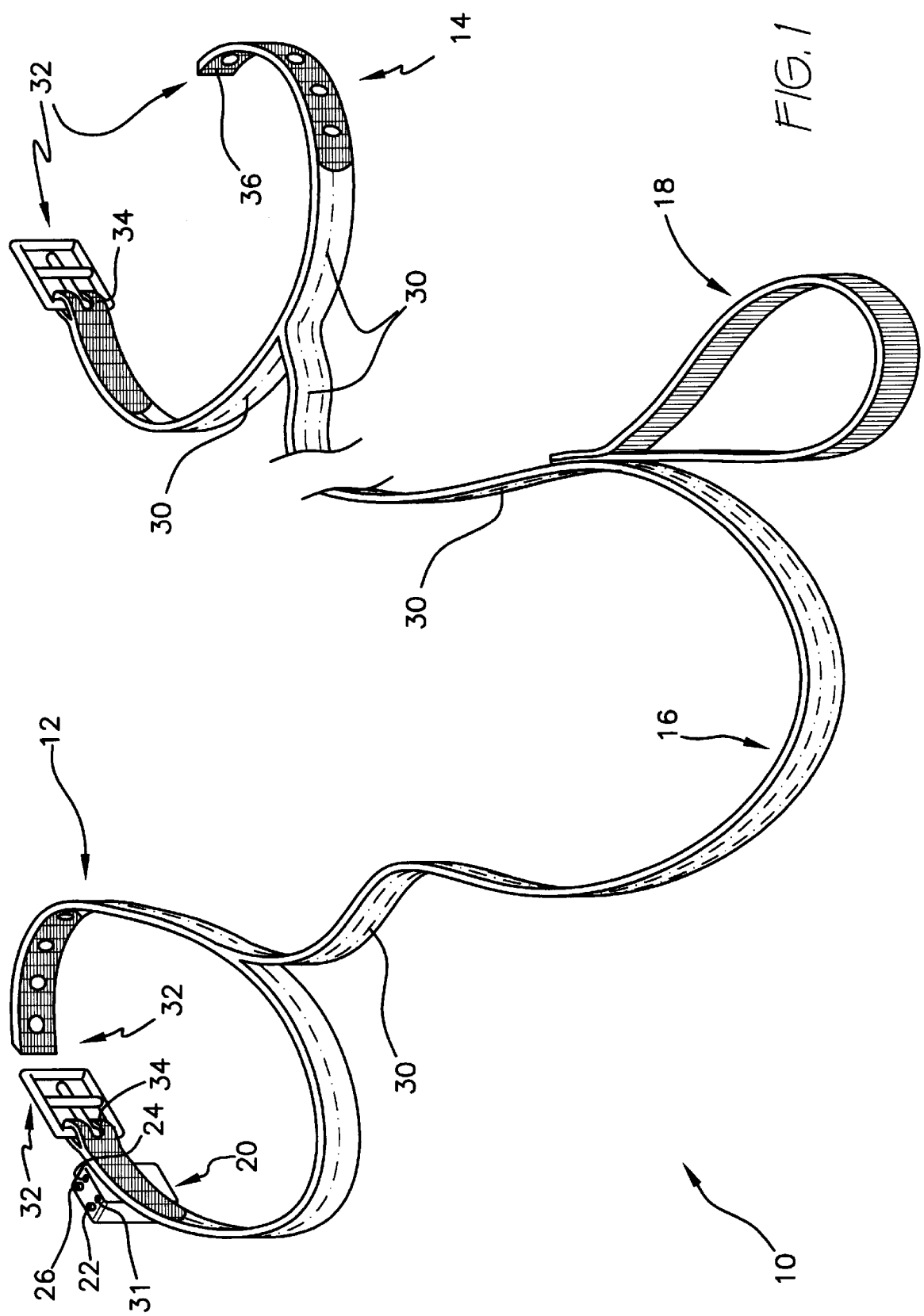
FIG. 1 is a perspective view of the preferred embodiment of the invention, showing the conductive plates at the end of the harness loops.

The child safety tether of the present invention is generally designated by the numeral 10 in FIG. 1. The apparatus consists of five main sections. The adult harness loop 12, the target harness loop 14, the tether section 16, the emergency strap 18, and the power and alarm box 20.

First the adult and target harness loops (12 and 14, respectively) will be discussed. Both of these have fastening means 32 attached to their ends. The fastening means, in the embodiment described herein, is substantially similar to those used in belts, each with a buckle, designated at terminal end 34, and a tongue, denoted at terminal end 36. It should be emphasized that other fastening means could be used to tighten the harnesses snugly about the user's waist, such as snaps or clips. As will be discussed further below, a small amount of overlap at the edges is necessary for the proper operation of the invention, but this can be achieved by any number of well known fastening means. In between the two harness loops 12, 14 is the tether portion 16. It is contemplated that both the harness loops 12, 14, the tether portion 16, along with the emergency strap 18 would all be manufactured from what is commonly referred to as "webbing". This is approximately 1–1½ inches wide and made from nylon. The terminal ends 34, 36 of both the harness loops are covered with a conductive adhesive tape. An example of this kind of tape is CMP Conductive Mask and Peel Tape, manufactured by SCHLEGEL Corp. PO Box 23197, Rochester, N.Y. 14692 and is listed under Part No. 5931-0050-0. This tape can be attached on one or both sides of the webbing with the stripped ends of the wires (denoted at 30) placed underneath and in contact therewith such that when fastening means 32 are used, a complete circuit will be formed. It is also contemplated that the wire 30 would be woven or sewed through the webbing to make it as integral therewith as is possible.

Another feature of the present invention is the emergency strap 18. This is a formed separate loop of webbing, outside of the circuit loop (with no wire embedded therein), and preferably placed so that it is within a few feet of the target or child harness loop 14. This emergency strap allows the adult care giver to quickly pull the child back towards them. This would be useful in the case of a stranger making a grab at the child, or the child moving towards a curb or other hazardous area.

Figure 2:
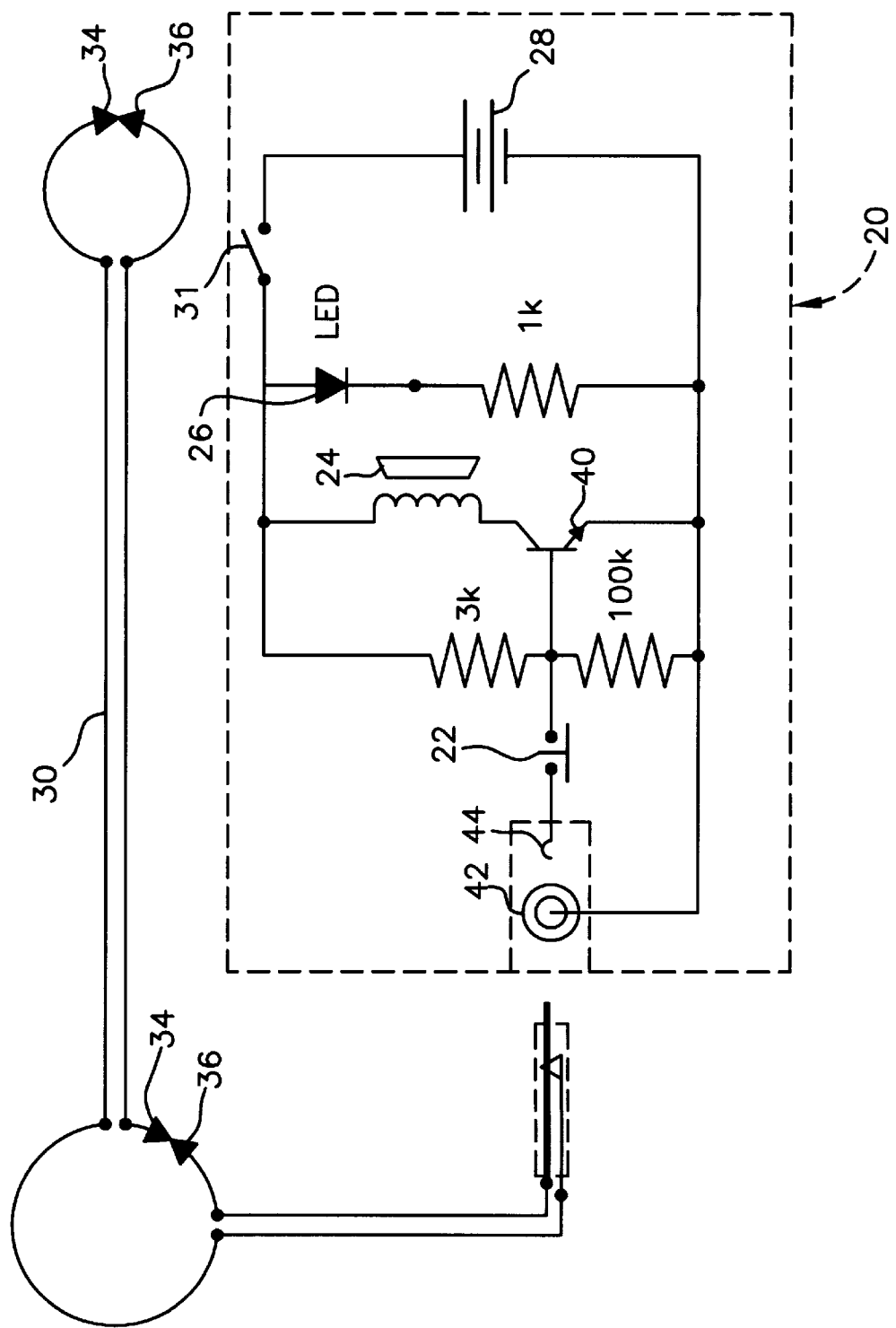
FIG. 2 is an electrical schematic diagram of the preferred embodiment of the invention.

The discussion now turns to FIG. 2 and the details of the preferred embodiment. Again, it should be noted that this is only one method of achieving the desired result of the preferred invention and that modifications could easily be made by the skilled practitioner to achieve the same result. In the embodiment detailed in FIG. 2, the internal components of the power and alarm box 20 are enclosed within the indicated broken lines. It is contemplated that the box 20 would include a test switch 22, a buzzer indicated at 24, an LED indicated at 26, and would be powered by a standard 9 volt battery 28. A power switch, indicated at 31, would also be provided to deactivate the indicators when the unit was not in use or being taken on or off. These switches and indicators are also seen in FIG. 1 at the appropriate locations on the power box 20. The test switch 22 would be used to assure the user that sufficient power was available through the battery 28 (or other power means used) to activate the buzzer 24, and also to familiarize the user with the sound that the buzzer 24 would make if the circuit is broken. The power and alarm box 20 is located proximate either of the harness loops 12 and 14. In detail then, when contacts 42, 44 are shorted together (regular operation) transistor 40 will prevent current flow through buzzer 24. When 42 and 44 are separated, simulating a break in the loop, transistor 40 latches to allow current to flow through the buzzer 24. Thus test switch 22 effectively simulates an opening in the loop. Power switch 31 effectively removes battery power (indicated at 28) from all components.

LED 26 serves as a power indicator and is activated by power switch 31. It should be noted that LED 26 could be used as an additional visual alarm cue if it were in series with buzzer 24, thus being turned off when the loop was opened. Other types of alarms, such as the vibrating indicators used in message beepers, could also be used in a similar manner.

It is to be understood that the present invention is not limited to the sole embodiment described above, but encompasses any and all embodiments within the scope of the following claims:

I claim:

1. A safety tether device, comprising:

A tether portion including a first end and a second end;

a first harness loop proximate said first end of said tether portion, said first harness loop including a pair of first harness loop free ends, said first harness loop free ends including engagement means for attaching said first harness loop free ends one to the other;

a second harness loop proximate said second end of said tether portion, said second harness loop including a pair of second harness loop free ends, said second harness loop free ends including engagement means for attaching said second harness loop free ends one to the other;

alarm circuit means including alarm means and power supply means, wherein said first and said second harness loop free ends further include flat overlapping conductive surfaces electrically connected with said power supply means such that when both said first and second harness loop engagement means are engaged, said power supply means supplies power to said alarm circuit means and when any of said harness loop engagement means are disengaged to detach said first or said second harness loop free ends from one another said power supply means is interrupted and said alarm means is activated.

2. The safety tether device according to claim 1, wherein said power supply means and said alarm means are contained within a housing, and said housing is located proximate said first or said second harness loop.

3. The safety tether device according to claim 2, wherein both first and said second harness loop engagement means are a buckle and tongue type.

4. The safety tether device according to claim 2, wherein said flat overlapping conductive surfaces comprise conductive adhesive tape.

5. The safety tether device according to claim 1, further including a testing means, said testing means comprising a switch to interrupt said power supply means and activate said alarm means.

6. The safety tether device according to claim 5, wherein said power supply means and said alarm means are contained within a housing, and said housing is located proximate said first or said second harness loop.

7. The safety tether device according to claim 6, wherein both first and said second harness loop engagement means are a buckle and tongue type.

8. The safety tether device according to claim 6, wherein said flat overlapping conductive surfaces comprise conductive adhesive tape.

9. The safety tether device according to claim 1, further including a power supply switch and power indication means, said power indication means comprising a light emitting diode connected to said power supply means and said power supply switch such that when said power supply switch is actuated, said light emitting diode emits visible light.

10. The safety tether device according to claim 9, wherein said power supply means, said power indication means, said power supply switch, and said alarm means are contained within a housing, and said housing is located proximate said first or said second harness loop.

11. The safety tether device according to claim 10, wherein both first and said second harness loop engagement means are a buckle and tongue type.

12. The safety tether device according to claim 10, wherein said flat overlapping conductive surfaces comprise conductive adhesive tape.

* * * * *